(12) United States Patent
Popp et al.

(10) Patent No.: US 8,836,924 B2
(45) Date of Patent: Sep. 16, 2014

(54) SENSOR APPARATUS, PRODUCTION METHOD AND DETECTION APPARATUS

(75) Inventors: Martin Popp, Chur (CH); Beat De Coi, Sargans (CH)

(73) Assignee: Espros Photonics AG, Sargans (CH)

( * ) Notice: Subject to any disclaimer, the term of this patent is extended or adjusted under 35 U.S.C. 154(b) by 281 days.

(21) Appl. No.: 13/355,814

(22) Filed: Jan. 23, 2012

(65) Prior Publication Data
US 2013/0187031 A1 Jul. 25, 2013

(30) Foreign Application Priority Data

Jan. 23, 2012 (EP) ..................................... 12000403

(51) Int. Cl.
*G01C 3/08* (2006.01)

(52) U.S. Cl.
USPC .......................... 356/5.01; 356/3.01; 356/4.01

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 6,399,286 B1 | 6/2002 | Liu et al. | |
| 7,265,397 B1 | 9/2007 | Tower et al. | |
| 7,547,622 B2 | 6/2009 | Swain et al. | |
| 7,636,150 B1 * | 12/2009 | McCauley et al. | ........... 356/5.01 |
| 2006/0018161 A1 | 1/2006 | Chen et al. | |
| 2006/0216871 A1 | 9/2006 | Sollner et al. | |
| 2008/0165620 A1 | 7/2008 | Sugiura | |
| 2008/0239466 A1 | 10/2008 | Buettgen | |
| 2011/0228153 A1 | 9/2011 | Chevallier | |
| 2012/0001242 A1 | 1/2012 | Rhodes | |

OTHER PUBLICATIONS

Atsushi Yokoyama et al "Realtime Range Imaging using Adjustment Free Photo-VLSI Silicon Range Finder" Intelligent Robots and Systems '94, 'Advanced Robotic Systems and the Real World', IROS '94, Proceedings of the IEEE/RSJ/GI International Conference in Munich, Germany, Sep. 12-16, 1994, New York, NY, Bd 3, Sep. 12, 1994, pp. 1751-1758.*

(Continued)

*Primary Examiner* — Luke Ratcliffe
(74) *Attorney, Agent, or Firm* — Burr & Brown, PLLC

(57) ABSTRACT

A sensor apparatus including at least one analog and one digital circuit component and an analog/digital converter for converting analog signals of the analog circuit component into digital signals for the digital circuit component, and vice versa, wherein the analog circuit component and the digital circuit components include at least one module for electronically implementing a function, and wherein one of the modules of the analog circuit component is embodied as a sensor device for detecting optical radiation and one of the modules of the digital circuit component is embodied as a signal processing device for processing digital signals. In order to enable improved integration into application-based sensor devices, the circuit components including the analog/digital converter are integrated as an integrated circuit in a chip and the chip is manufactured as a semiconductor structure using 1-poly technology.

20 Claims, 5 Drawing Sheets

(56) References Cited

OTHER PUBLICATIONS

Atsushi Yokoyama et al., *"Realtime Range Imaging Using Adjustment-Free Photo-VLSI-Silicon Range Finder,"* Intelligent Robots and Systems '94, 'Advanced Robotic Systems and the Real World', IROS '94, Proceedings of the IEEE/RSJ/GI International Conference in Munich, Germany, Sep. 12-16, 1994, New York, NY, Bd 3, Sep. 12, 1994, pp. 1751-1758.

Masaaki Sasaki et al., *"A Wide-Dynamic-Range CMOS Image Sensor Based on Multiple Short Exposure-Time Readout with Multiple-Resolution Column-Parallel ADC,"* IEEE Sensors Journal, vol. 7, No. 1, Jan. 2007, pp. 151-158.

European Search Report dated Jul. 13, 2012.

International Search Report and Written Opinion dated Jul. 8, 2013.

Invitation to Respond to Written Opinion, a Search Report; and a Written Opinion from a corresponding Singapore patent application bearing a mailing date of Jun. 30, 2014.

\* cited by examiner

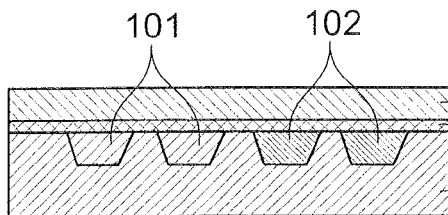
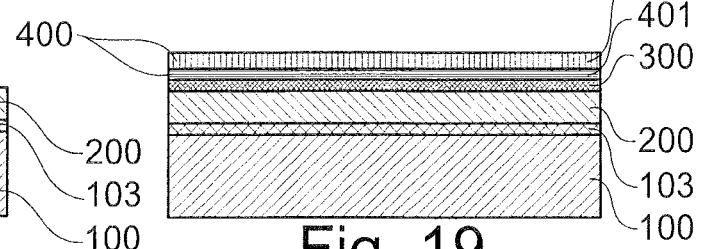
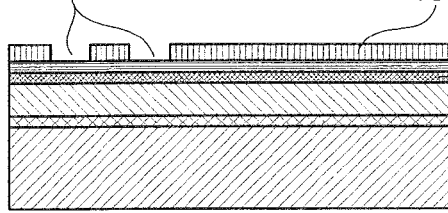
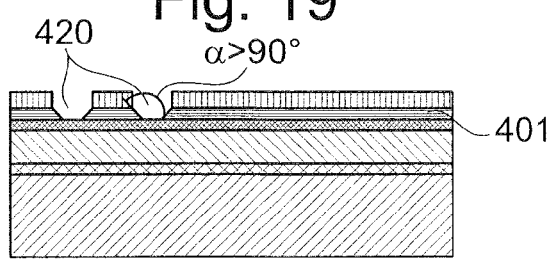
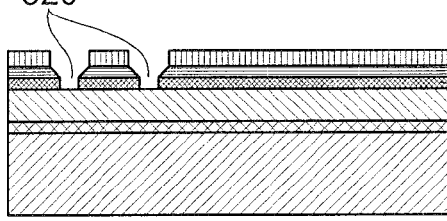
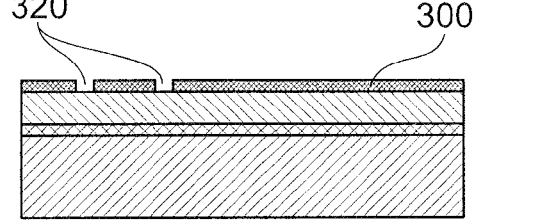
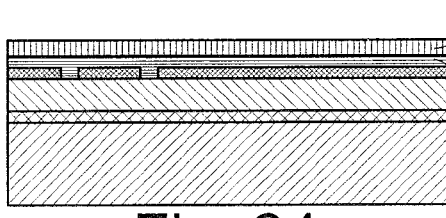
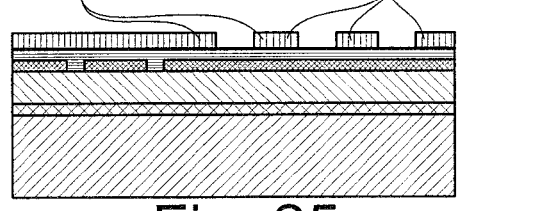
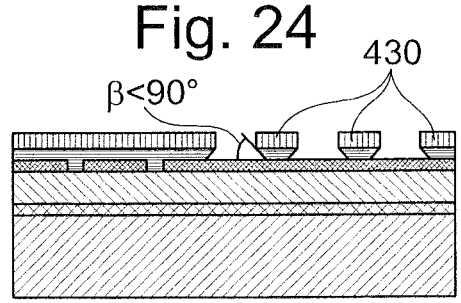
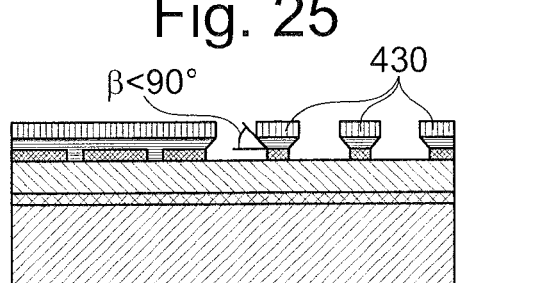
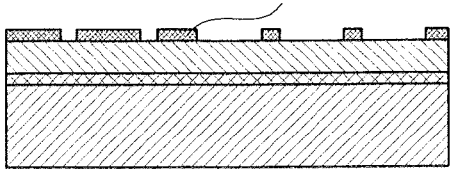
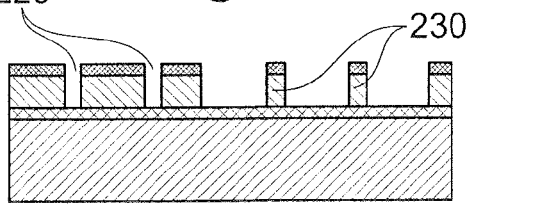

a sensor apparatus, in particular a time-of-flight (TOF) and/or CCD sensor apparatus for a 3-D camera sensor, a method for producing the sensor apparatus, and a detection apparatus.

SENSOR APPARATUS, PRODUCTION METHOD AND DETECTION APPARATUS

FIELD OF THE INVENTION

The invention relates to a sensor apparatus, in particular a time-of-flight (TOF) and/or CCD sensor apparatus for a 3-D camera sensor, a method for producing the sensor apparatus, and a detection apparatus.

BACKGROUND OF THE INVENTION

While on the one hand there is a general trend toward ever greater miniaturizations in the chip design, on the other hand many chips and optoelectronic sensor apparatuses can only be used to a very limited extent and have to be implemented in some instances in a complex manner with provision of some peripherals in cameras or other sensor devices. Difficulties can occur, in particular, because corresponding sensor devices are too large and too complex, but often the necessary robustness is also lacking with respect to the application-related requirements.

SUMMARY OF THE INVENTION

It is an object of the invention to propose a sensor apparatus and a method for producing it which enables improved integration into application-based sensor devices or detection apparatuses.

Accordingly, a sensor apparatus according to the invention is distinguished by the fact that the circuit components including the analog/digital converter are integrated as an integrated circuit in a chip, wherein the chip is manufactured using 1-poly technology.

The sensor apparatus according to the invention is, in particular, a time-of-flight (ToF) and/or CCD (charge coupled device) sensor apparatus for a 3-D camera sensor. A typical industrial application consists, for example, in providing a monitoring apparatus for a door, a gate system or the like. The invention makes it possible to provide a so-called system-on-chip (SoC) for pixel-based detection of a 3-D area, which, in particular, is also suitable for industrial applications. The sensor apparatus can serve as the principal element of a 3-D camera, that is to say as a 3-D camera sensor, wherein it is preferably embodied as a time-of-flight or CCD sensor apparatus.

The sensor apparatus according to the invention comprises at least one analog and digital circuit component and an analog/digital converter for converting analog signals of the analog circuit components into digital signals for the digital circuit component, and vice versa. Both types of circuit components, namely analog and digital circuit components, in each case comprise so-called modules which enable electronic implementation of a function (e.g. data processing, data storage, driver functions, phase adjustment, amplifications, etc.). In the case of the sensor apparatus according to the invention, one module of the analog circuit component is embodied as a sensor device for detecting electromagnetic radiation, in particular IR radiation. Consideration is preferably given to applications in the field of optical or optoelectronic sensor technology (e.g. in the visible range (wavelength of approximately 400 nm-800 nm), ultraviolet (UV) or IR range). The detection of infrared radiation (IR radiation) can regularly be involved precisely in the case of monitoring systems. One important function of modules of the analog circuit component is, therefore, primarily the influencing, taking place in the actual sensor (ToF sensor, CCD), or the transport of free charge carriers (free-charge handling).

Furthermore, at least one module of the digital circuit component is embodied as a signal processing device for processing digital signals, a so-called digital domain for signal processing. Further functions which can be implemented by additional modules of the digital circuit component concern, for example, phase modulation, measurement and regulation of phase shifts, if these functions are required for time-of-flight measurements, for example.

By virtue of the measure that the sensor apparatus is integrated in a single chip and a system-on-chip solution is thus provided, the sensor apparatus according to the invention can be integrated particularly well into a wide variety of sensors, sensor apparatuses, cameras, monitoring apparatuses, etc. Besides the user-friendliness made possible by this integration, the apparatus according to the invention additionally also affords cost advantages, since the individual, sometimes expensive, functional modules are already integrated in the one chip. In particular, the sensor apparatus according to the invention or the system-on-chip according to the invention affords a particular space saving by virtue of which the possibilities of integration into a wide variety of application systems are additionally increased as well.

The sensor apparatus according to the invention in the form of a system-on-chip consequently enables the integration of modules for all the functions which are important for a sensor, as a result of which it can be implemented particularly advantageously into a wide variety of systems. As a result, by way of example, a detection apparatus which uses the sensor apparatus according to the invention can fulfill particular robustness with respect to a wide variety of application-related requirements (ambient light, detection of objects having different optical properties such as e.g. reflectivity).

The sensor apparatus according to the invention or the system-on-chip according to the invention is manufactured using 1-poly technology (single-polysilicon technology). Stacked double structures (2-poly) are thus avoided, and the construction thus becomes, in principle, flatter and additionally less complex. The entire chip, in particular also the CCD, can correspondingly be produced using 1-poly technology according to the invention. CCD chips are usually manufactured using 2-poly technology.

The integration of a non-volatile memory on the chip for storing configuration parameters, in particular an EEPROM (electrically erasable programmable read-only memory), is particularly preferred. This allows a crucial step toward a fully integrated system-on-chip which not only has a compact and space-saving design but also can itself in turn be integrated outstandingly into sensors and measuring apparatuses. Moreover, the robustness of such a fully integrated variant according to the invention can be increased significantly by comparison with conventional sensor apparatuses.

In one advantageous development of the invention, the EEPROM can be embodied as an FGFET (floating gate field effect transistor). Such an FGFET structure has a respective source and drain terminal, and additionally a control terminal, the so-called control gate. A region designated as a floating gate is situated in the region of the control gate. Charges can be "stored" permanently in said region of the floating gate. Depending on the charge state of the floating gate region, the source-drain path is at high impedance or low impedance. This difference can be used, for example, for coding the information to be stored.

A corresponding FGFET is then likewise embodied as a 1-poly structure. Consequently, the control gate is not embodied as a double structure in which the floating gate is situated below the control gate, said floating gate being separated from the rest of the bulk material by means of a gate oxide, rather the floating gate is embodied as a layer that also extends over the region from source toward drain. In this case, the region of the control gate can be separated from the region of the source-drain path by means of a further field oxide region. The control gate can be arranged in the bulk structure outside the source-drain path.

Since the floating gate does not form a stacked structure with the control gate in 1-poly design, the gate structure can, in particular, also comprise a control gate in the form of a buried layer (buried control gate), which is arranged in the bulk material of the semiconductor itself (embodiments: e.g. ETOX, FLOTOX). In the case of this proposed design, moreover, it is also possible to save material for the oxide layer that would otherwise be required for insulation in the case of a 2-poly structure.

In one preferred embodiment of the invention, subnominal gaps are formed in the analog circuit component, while subnominal lines are manufactured in the digital circuit component. The term "subnominal" means below the critical dimension, i.e. below the smallest directly producible feature size. The so-called bi-subnominal etching method serves as a production method for said lines and gaps, said etching method making it possible to produce particularly narrow structures which cannot be achieved using conventional etching methods and the associated masks. By means of this method it is possible to produce structures which are below the minimum critical dimensions which can usually be achieved for a mask step. These narrow structures make it possible, in the case of semiconductor structure elements such as EEPROMs or CCDs, to be able to influence charge carrier packets by means of fields, since the distances can be made correspondingly small, without structure overlaps or similar measures being necessary. Consequently, this production method is particularly suitable for producing structures that are as small as possible, such as are often desired in the case of CCDs, for example, in order to achieve a smallest possible distance between the gate structures.

The digital circuit components can correspondingly comprise narrow lines, that is to say e.g. for short transistors, in order to enable transistors to be densely packed and thus in order to be able to obtain high performance in the signal processing.

Furthermore, the analog circuit components require narrow gaps for influencing and for transporting free charge carriers by means of fields and for detecting charge packets (so-called free-charge handling).

The analog/digital converter, by contrast, advantageously has wide lines owing to the tolerance with respect to high voltages.

With regard to the construction of the semiconductor structure of the sensor apparatus it is moreover conceivable, in principle, for analog and digital circuit components to be separated by so-called guard rings. Such guard rings are highly doped ring structures surrounding semiconductor structure regions to be delimited, such that it is thereby possible for the parasitic resistances to decrease and, on the other hand, it is in turn possible for stray charge carriers to be intercepted by the guard rings. Furthermore, it is possible to prevent semiconductor structures that are to be shielded from being driven on account of parasitic effects. Furthermore, individual modules can also be separated by guard rings.

A series of modules can be integrated on the chip according to the invention. In one exemplary embodiment, moreover, the digital circuit component can comprise at least one of the following modules (alongside the digital domain for signal processing, the A/D converter and the non-volatile memory):
  an apparatus for controlling a phase shift, in particular a DLL (delay-locked loop),
  a timer resonant circuit, in particular a PLL (phase-locked loop).

In addition, the analog circuit component can comprise at least one of the following modules (alongside the sensor and modules for so-called free-charge handling):
  a sensor for detecting radiation together with a structure for transporting induced free charge carriers,
  an amplifier,
  a voltage regulator,
  a voltage converter,
  a temperature sensor.

In one particularly preferred embodiment of the invention, on a sensor apparatus according to the invention as a fully integrated system-on-chip, the following analog and digital modules can be integrated together: a TOF pixel matrix for optical detection, a voltage supply or voltage regulation, the non-volatile memory for the corresponding configuration, an LED driver or an LED controller for the active illumination by the sensor apparatus, a digital SPI interface for communication, the A/D converter, the PLL and further data processing electronic components or electronic components which can be used for volatile data storage.

The DLL can, for example, independently measure and regulate the phase shift between LED and LED driver. The timer is stabilized by a corresponding timer resonant circuit (PLL).

The sensor for radiation detection is, for example, a pixel matrix which is embodied as a CCD and influences and transports radiation-induced free charge carriers by means of fields. A temperature sensor in turn can be provided for performing a correction of the temperature drift of the entire sensor apparatus, wherein, by way of example, corresponding calibration data stored as configuration parameters in the EEPROM are used for this purpose. By virtue of the fact that all these modules can be combined in a single system-on-chip, it is additionally possible to save expensive and space-consuming peripheral components such as FPGAs (field-programmable gate array) for processing logic, A/D converters, components for power supply, etc.

The digital circuit components can be manufactured, in principle, in CMOS processes (complementary metal-oxide semiconductor).

In the present case, a particular CMOS process is proposed for a sensor apparatus according to the invention, said CMOS process being distinguished by some advantages, precisely in the area of infrared detection, by comparison with standard CMOS methods. Commercially available standard CIS sensors (abbreviation of "CMOS image sensor") comprise so-called pinned photodiodes, the photosensitive detection region of which comprises only a thickness of a few micrometers, that is to say is smaller than the absorption length of light having a wavelength of 850 nanometers in silicon, namely an absorption length of approximately 13 micrometers. The high quantum efficiency in the CMOS components now proposed is made possible firstly by illumination of the components from the back side (back-side illumination) and the extremely short detection times for the charge carriers formed in a detection.

The CCD sensor device can be constructed for example as follows: the semiconductor structure for photon detection comprises a substrate composed of a semiconductor material having a first doping, a contact region applied to the front side of the substrate, a bias layer composed of a semiconductor material having a second doping, which is arranged on the back side of the substrate at a distance from the contact region, wherein the contact region is at least partly opposite the bias layer, such that an overlap region is present in a lateral direction, a guard ring, which is arranged on the front side of the substrate and surrounds the contact region, wherein a reverse voltage can be applied between the contact region and the guard ring, by virtue of the fact out that the overlap region has a lateral extent amounting to at least one quarter of the distance between the contact region and the bias layer. As a result of this solid relationship, it is possible not only for the potential in the bulk material to be influenced by the potential applied to the contact region, but likewise the potential of the bias layer. A potential channel arises, a conduction channel between the contact region and the bias layer lying opposite. The bulk material can be obtained for the sensor apparatuses using the float-zone method (float-zone silicon). This material is distinguished by very low defects and by particular homogeneity. The conductivity is from several hundred ohms×centimeter ($\Omega$ cm) to several kilohms×centimeter (k$\Omega$ cm). The sensor apparatus according to the invention or the corresponding embodiment, by virtue of these measures, can make possible not just particularly good detection; these measures also permit the sensor apparatus to be suitable for a wide variety of conditions, for instance under the influence of ambient light and in the case of a wide variety of optical properties of the objects to be detected, which can moreover move.

On account of their different functions, in one exemplary embodiment of the invention, the circuit components or the respective modules of the circuit components can be designed for different voltages. One function of modules of the analog circuit component consists in the detection and influencing of charge packets (free-charge handling). The corresponding detection module is, for example, part of the TOF sensor. Further modules of the analog circuit component have as function inter alia voltage regulation and voltage conversion, temperature detection, amplification for suppressing background noise, modules having a driver function for the light emitting diode, etc. Accordingly, it is advantageous for the modules of the analog circuit component to be designed for higher voltages than those of the digital circuit component.

The analog and digital circuit components comprise semiconductor components in which oxide layers are used for electrical insulation. One example thereof is, for instance, the gate oxide, which, in the case of a transistor, for example, separates or insulates the gate from the rest of the bulk material. In addition, other oxide layers can also be present, for example the field oxide or other intermediate oxide layers. In order, accordingly, in the case of analog circuit components, to be able to avoid a voltage breakdown, advantageously in one development of the invention oxide layers of the analog circuit components are embodied as thicker than those of the digital circuit components. The thicknesses of the gate oxide of the EEPROM can be chosen to be smaller than the thicknesses of the gate oxide layers of the modules of the analog circuit component, but in turn greater than the thicknesses of the gate oxide layers in modules of the digital circuit component, e.g. the digital domain. Preferably, the gate oxide layers of the analog circuit components have a thickness of 9 nm to 15 nm, the gate oxide layer of the EEPROM has a thickness of 6 nm to 10 nm, and the gate oxide layer of the remaining digital circuit components has a thickness of 1.5 nm to 3 nm (where: nm: abbreviation of nanometer).

Furthermore, a method for producing a sensor apparatus according to the invention is correspondingly proposed. In particular, at least one part of the method for production can comprise a 200 nm CMOS manufacturing method. This involves a manufacturing method which firstly is established in semiconductor manufacture, but with regard to its accuracy makes requirements that still allow comparatively cost-effective production.

In one particularly preferred development of the invention, the gaps and lines of the semiconductor components are produced by means of a bi-subnominal etching method, which makes it possible to produce particularly narrow structures which cannot be achieved using conventional etching methods and the associated masks. This measure for production makes it possible, in particular, to be able to provide the sensor apparatus according to the invention as a fully integrated system-on-chip.

A detection apparatus according to the invention is distinguished by the fact that a sensor apparatus according to the invention is provided. The detection apparatus can serve, for example, as a monitoring device which monitors the movement of a movement element, for instance of a gate or of a door. In this case, the intention is to avoid collisions with objects, for instance if persons encroach on a door gap and there is the risk of contusions or other articles are trapped, in which case the drive of the door could also incur damage in the process.

The chip according to the invention can be soldered, for example, onto a printed circuit board. The printed circuit board can be equipped with the voltage supply, for instance. If active illumination is required, the printed circuit board can, if appropriate, also carry a light source, such as e.g. light emitting diodes. A use of the sensor apparatus in a wide variety of sensor devices is conceivable, in principle.

BRIEF DESCRIPTION OF THE DRAWINGS

An exemplary embodiment of the invention is illustrated in the drawings and is explained more thoroughly below with indication of further details and advantages.

Specifically, in the figures:

FIGS. 18 to 29 show a variant of the etching method in accordance with FIGS. 6 to 17.

DETAILED DESCRIPTION OF THE INVENTION

Figure 1:
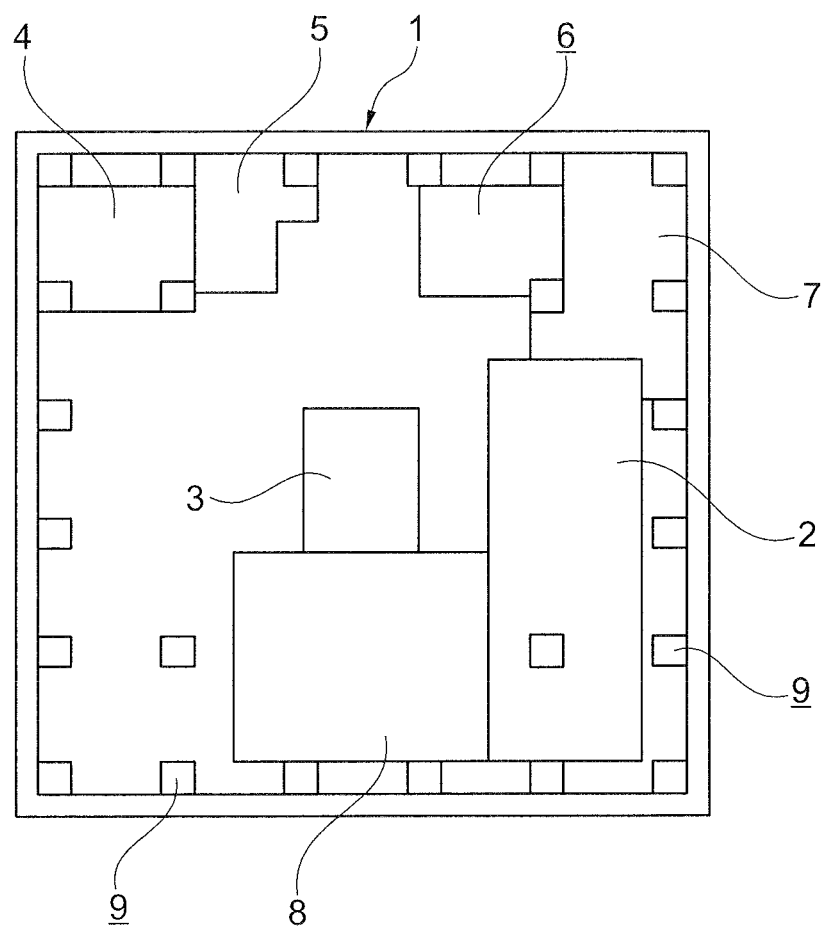
FIG. 1 shows a schematic illustration of a sensor apparatus (SoC) according to the invention.

FIG. 1 shows a schematic illustration of a plan view of a sensor apparatus 1 according to the invention, which is embodied as a fully integrated system-on-chip. The entire chip 1, as is illustrated in FIG. 1, has a size of 2.55 mm×2.55 mm (where: mm: abbreviation of millimeter). Specifically, only the regions in which essential modules are arranged are illustrated; other electronics, conductor tracks or the like, which may be illustrated in specific detail only with difficulty anyway in the size of the drawing, have been omitted in FIG.

1. The schematically illustrated component mounting plan shows, inter alia, the following modules and circuit components, namely the digital domain 2 for signal processing, the pixel matrix 3 for detection, the voltage converter (charge pump) 4, the driver for the light emitting diode (LED) 5, the EEPROM 6 for storing configuration parameters, a module 7 comprising both a resonant circuit (PLL, phase-locked loop) and an apparatus for measuring and regulating the phase shift between LED and LED driver (DLL, delay-locked loop).

Furthermore, a module is illustrated which has elements of analog and digital circuit components, namely the A/D converter 8. Furthermore, contact areas 9 are illustrated. The system-on-chip 1 which is illustrated in FIG. 1 and which is manufactured using 1-poly technology is the particularly preferred embodiment of the invention. For monitoring purposes, the pixel matrix can comprise 8×8 pixels. Each pixel can operate independently of the others. Furthermore, each pixel in turn has two output channels which can be read and analyzed in order to determine the relative phase offset with respect to the phase of the emitted light. In the case of a monitoring sensor, it is basically sufficient to measure an individual distance, and so it suffices to form an average value over the pixels present and the read information thereof. The individual pixels can also be weighted differently.

For the illustrated embodiment of the chip 1, an individual voltage source suffices, which makes available a voltage of 8.5 V, since voltages required further are provided by means of integrated voltage converters. Since the sensor operates with active illumination, that is to say itself has a light source used for detection purposes, 1 to 3 LEDs are typically required as luminous means in the present case. The distance can be read out for example by means of PWM (pulse width modulation) or by means of an SPI register. Commands and setting of the registers can be effected by means of an SPI protocol.

The use of a CCD structure makes it possible, in particular, that the charge carrier packets can be influenced or detected in a short time. This is particularly important in connection with the use of TOF sensors, since the latter typically have to make detections in the range of a few nanoseconds. Essentially, the response to a short emitted light pulse of the LED is in this case recorded and measured. The sensor chip 1 additionally also makes it possible to perform distance measurements with regard to articles having a different reflectivity. In this case, the distance can typically be from a few centimeters to several meters.

Figure 2:
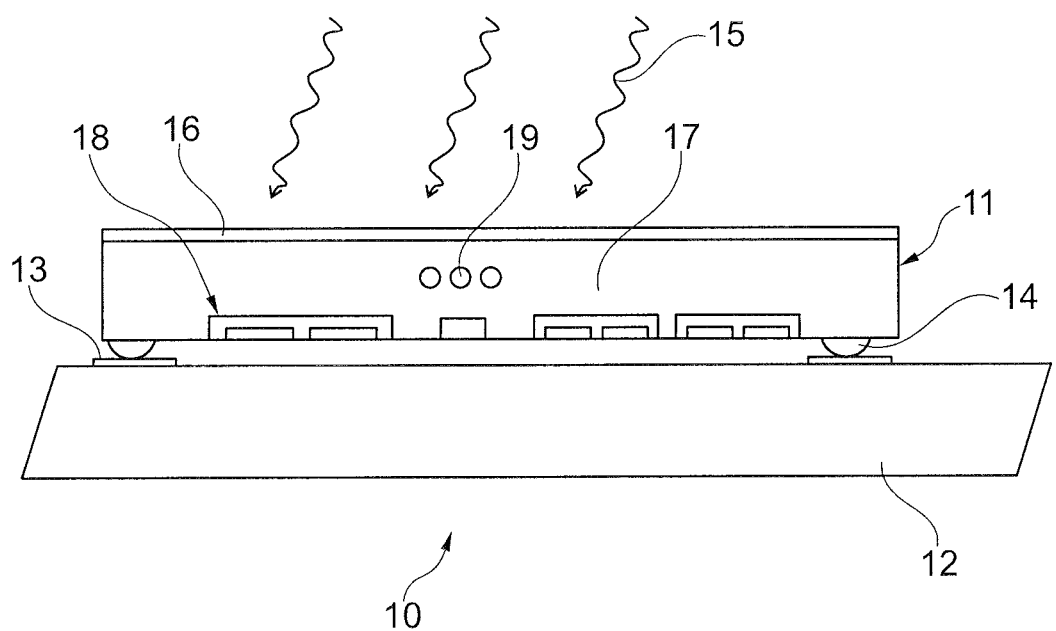
FIG. 2 shows a schematic illustration of the combination of the sensor apparatus with a PCB according to the invention.

FIG. 2 shows a schematic illustration of a sensor circuit 10 comprising a sensor apparatus as chip 11, which is applied on a printed circuit board 12 (PCB). For contact-connection, the chip 11 is soldered directly on the printed circuit board 12. For contact-connection, so-called pads 13 are available on the printed circuit board 12. Said pads 13 or contact points produce the connection to further conductor tracks. The chip 11 is fitted on the pads 13 by means of solder balls 14. In the sensor region, the chip 11 is illuminated from the back side of the sensor. In this case, the incident photons 15 firstly impinge on a layer of filter material and microlenses 16. Situated thereunder in turn is the bulk material 17, which substantially consists of float-zone silicon. The electronic circuits 18, which serve, inter alia, for detection, are situated on the unilluminated side of the sensor (the actual "front side" of the semiconductor component), facing the printed circuit board 12. That region of the bulk material 17 into which the incident photons 15 pass is present as a full depletion zone. The photons 15 in turn generate charge carriers 19 in the bulk material 17, which can in turn be detected by the circuits 18 of the sensor.

The quantum efficiency of a photo detector is generally dependent on the following four factors:
- absorption properties of the bulk material (that is to say of silicon);
- the thickness of the non-sensitive layer in which short recombination times of the charge carriers generated predominate (these recombination times are the limiting factor particularly for the UV range with short wavelengths);
- the thickness of the depletion zone, which means a cut-off in the long-wave range;
- the reflection properties of the surface.

Particularly in applications in the area of monitoring, detection in the infrared range is often used. An improvement in the UV range can be effected, for example, by optimizing the aftertreatment on the back side for ultra-thin, insensitive layers. In the UV range, the absorption length in silicon is only a few nanometers. However, in principle such an optimization step has nothing to do with the CMOS process used. The same applies to the surface properties on the detection side, the back side of the semiconductor structure, i.e. in particular to the reflectivity of the detection window. The sensor illustrated in FIG. 2 has the advantage, in particular, that, in principle, a large area is available as a result of the illumination from the back side. Float-zone silicon is used as bulk material or as basic constituent. In the analog circuit component, it is possible to employ voltages of the order of magnitude of up to 12 V.

The sensor apparatus proposed enables a quantum efficiency in a wavelength range of 520 nm to 900 nm of more than 80%. In this case, the temporal accuracy is even in the sub-nanosecond range. The sensor apparatus can be operated with a speed of up to 100 frames per second.

In one current embodiment, the entire sensor together with the printed circuit board has a size of 17 mm×28 mm, wherein the voltage supply, the controller and two LEDs for active illumination are already included in this case. The sensor is therefore also suitable, in particular, for applications in the area of monitoring, such that small, inconspicuous monitoring sensors can be used.

Furthermore, the sensor apparatus has a comparatively low energy consumption. A particularly critical factor with regard to the energy consumption is the active illumination for distance measurement by means of a TOF sensor. If the illumination is chosen to be much too weak, this sometimes detrimentally affects the accuracy of the distance measurement. In the case of the present embodiment, an energy of only 30 fJ (femtojoules) per pixel suffices to generate a signal of approximately 100,000 electrons and thus to achieve a quantum efficiency of 80% at a wavelength of 850 nm of the incident light. Overall, the LEDs typically need to be switched on for only 50% of the required integration time.

TOF sensors are distinguished precisely by enabling the background produced by ambient light (for example sunlight) to be reduced. This firstly makes possible a particularly precise measurement, but also in turn makes it possible to lower the energy consumption, since the active illumination can be chosen to be weaker, in principle.

Figure 3:
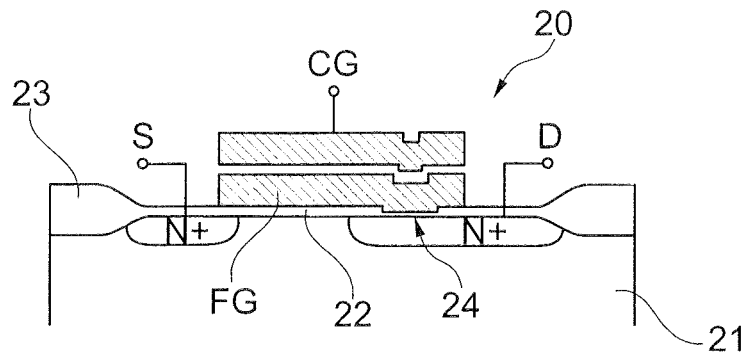
FIG. 3 shows a commercially available 2-poly flash memory cell (EEPROM)
Figure 4:
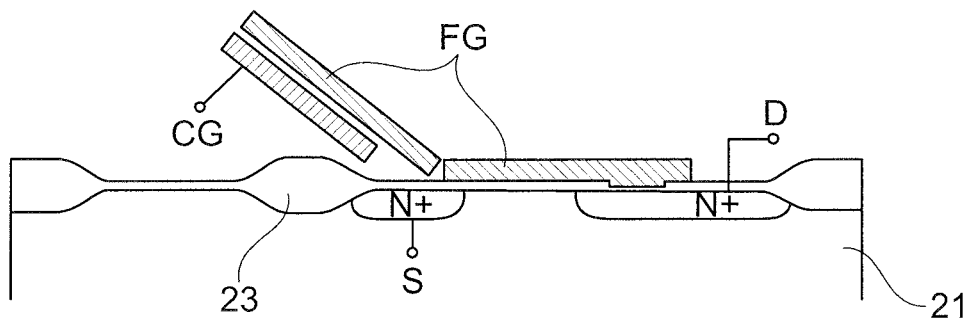
FIG. 4 shows a schematic illustration (conceptual) of the transition from the 2-poly flash cell to the single-poly flash cell.
Figure 5:
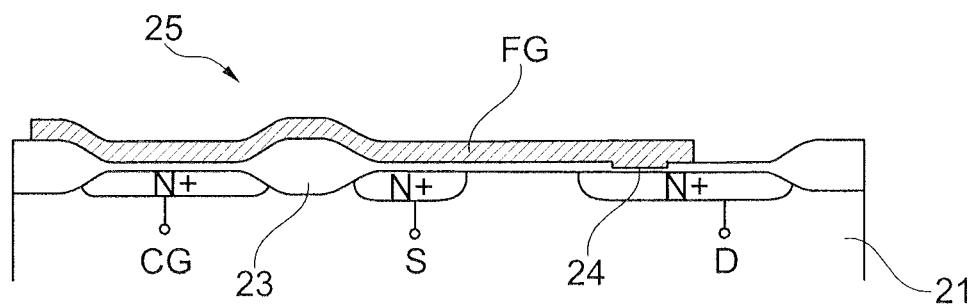
FIG. 5 shows a schematic illustration of a 1-poly EEPROM.

FIGS. 3 to 5 show a non-volatile memory in the form of an EEPROM 20. The EEPROM 20 is firstly manufactured using 2-poly technology in FIG. 3. The semiconductor structure has the terminals source S, drain D and, as control terminal, a control gate CG. The double structure composed of polysilicon comprises, in the region of the gate, the contact-connection of the control gate CG and a so-called floating gate FG stacked thereunder. Said floating gate FG serves for storing charges and thus for storing information. In the present case, the gate structure is situated on a bulk material 21 (here: p-type substrate). The floating gate FG is separated from the bulk material 21 by means of a gate oxide 22. In the edge region, the memory cell is insulated by a so-called field oxide 23. Furthermore, a tunnel oxide is provided. The charge that is intended to be stored in the floating gate FG can be influenced by means of the tunnel effect. The terminals in the region of source S and drain D are in each case embodied as a highly doped (n+) layer N+ (n: negative doping, "+" means high doping).

FIG. 4 shows how the transition from the 2-poly structure to the 1-poly structure is effected conceptually. The double structure is as it were "undone" in the region of the floating gate FG and "folded to the side". Otherwise, the imaginary structure from FIG. 4 generally corresponds to the structure from FIG. 3.

FIG. 5 finally shows the 1-poly structure of the EEPROM 25. This flash memory cell no longer has a double layer structure. Outside the source-drain path S-D is present, by means of a field oxide 23 of the control gate as buried highly doped (n+) layer (buried control gate). The control gate CG is situated below a gate oxide, the floating gate FG finally in turn being arranged thereabove. By means of the driving of the control gate CG, the floating gate FG is finally influenced, which, for its part, ensures that the source-drain path S-D changes its resistance. The information to be stored can be correspondingly coded.

Bi-Subnominal Etching:

This involves a method for producing semiconductor components on a substrate comprising photolithographic patterning steps, in which method, on the substrate, a first layer to be patterned is applied and a second layer serving as a mask layer for the first layer to be patterned is applied. In addition, a third layer serving as a mask for the second layer is applied, and at least two photolithographic patterning processes are carried out successively for the second layer, wherein, during one of the patterning processes, after the production of a structure made from a photosensitive layer for the provision of a mask layer for a patterning process at the third layer, positive ramp angles are produced at the patterning edges of the third layer, as a result of which the structures remaining free, given a thickness h of the third layer, decrease in size by a value $D=2*h/\tan \alpha$, and wherein, during the other of the patterning processes, after the production of a structure made from a photosensitive layer for the provision of a mask layer for a patterning process at the third layer, negative ramp angles β are produced at the patterning edges of the third layer, wherein the remaining structures, given a thickness h of the third layer, decrease in size by a value $W=2*h/\tan \beta$, and wherein the second layer is patterned on the basis of the respectively patterned third layer.

Figure 6:
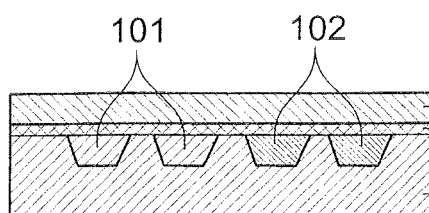
FIGS. 6 to 17 show the sequence of a bi-subnominal etching method for semiconductor components on a substrate with feature sizes which are less than the critical dimensions, on the basis of schematic sectional diagrams.

The starting point is e.g. a wafer 100 composed of silicon having doped regions 101, etched structures 102, which are used e.g. as active regions of a transistor, in which the gaps between the etched structures are filled with insulation material, in processes such as e.g. STI (shallow trench isolation) or LOCOS (Local oxidation of silicon). A dielectric 103, serving as a dielectric for transistor structures, can be applied to the wafer 100. Finally, this insulation layer is followed by a layer composed of polysilicon, for example, which is used later for producing the gate of the transistors, for example with a thickness of 200 nm. The polysilicon layer bears the reference symbol 200 (see FIG. 6).

Afterward, an insulation layer, in particular a silicon oxide layer 300, is applied to the layer 200. This layer should have chemical properties which are different than those of the underlying layer 200 and has e.g. a thickness of 50 nm. Thus, this layer, after its patterning, can be used as a mask for the patterning of the underlying layer.

Figure 7:
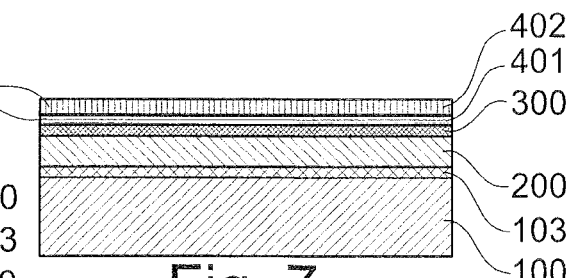

A layer stack 400 is applied thereon, which layer stack can consist of different layers, e.g. an antireflection coating 401 and a photoresist layer 402 (see FIG. 7).

The photoresist layer is patterned in order to obtain a first mask for the underlying layer 401. In this case, only the structures with which gap widths smaller than the critical dimension are intended to be created are realized in the photoresist layer. It goes without saying that this mask step can also be used to produce structures which are larger than the minimum structure. Furthermore, structures having a size of the minimum lines with regard to the critical dimension thereof can arise in this mask step. In principle, the criterion of the minimum feature size is complied with during the photolithographic process. The feature sizes smaller than the minimum feature size arise as a result of a subsequent patterning step on the basis of a photolithographic process in the region of the minimum possible feature sizes.

Figure 8:
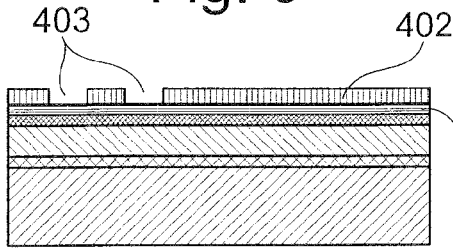
Figure 9:
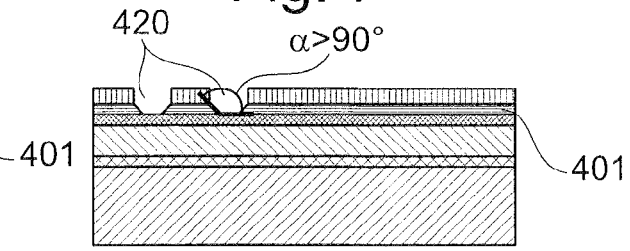

A patterned photoresist layer 402 with openings 403 ultimately remains (see FIG. 8). The layer 401 is then patterned using this patterned photoresist layer. A preferred etching step advantageously takes place in such a way that a positive ramp angle arises in the layer 401 at the edges of the structures. This produces in the layer 401 openings 420 which substantially have a constant offset of $D=2*h/\tan \alpha$, where h is the thickness of the layer 401. The angle α is by definition the angle formed by the oblique boundary of the layer 401 and the plane of the wafer. That means that an angle α>90° corresponds to a positive ramp angle, in the case of which openings 420 having a reduced size arise, whereas at an angle α<90° a negative ramp angle is present, in the case of which openings increase in terms of dimension. In FIG. 9, openings 420 are reduced in size at any rate in the present step. The ramp angle is positive (see FIG. 9).

Figure 10:
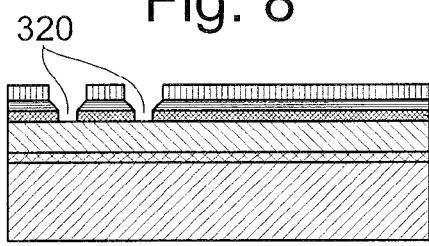

The underlying layer 300 (mask layer) is patterned using the patterned layer 401. This results in structures 320 (openings) in the layer 300 which correspond to the openings 420 in the layer 401 at the layer base thereof (see FIG. 10 and also FIG. 11).

Figure 11:
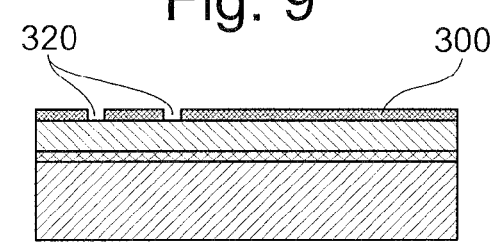

In FIG. 11, the layer 402 and 401, respectively, is completely removed before the next process step.

Figure 12:
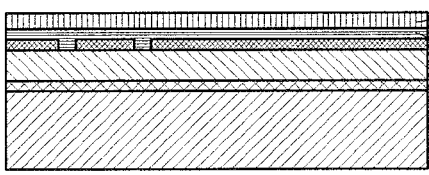
Figure 13:
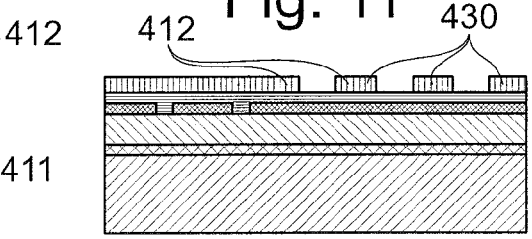

In accordance with FIG. 12, a layer 411 and 412, respectively, is applied, wherein the layer 411 corresponds to the layer 401 and the layer 412 corresponds to the layer 402. The layer 412 is a photoresist layer which is patterned in accordance with the structures in which the intention is to achieve a line width smaller than a line width which is still possible according to the critical dimension (see FIG. 13). Lines 430 can be seen in FIG. 13. These lines 430 are greater than or equal to the minimum line width using the photolithographic possibilities.

Figure 14:
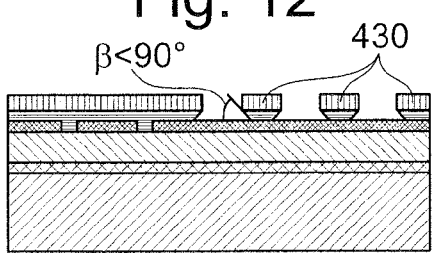
Figure 15:
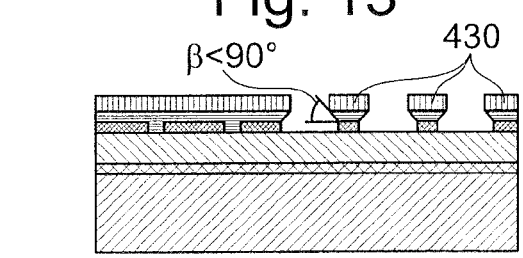
Figure 16:
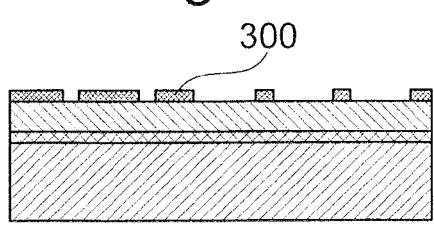

Using the patterned layer 412 with lines 430, the underlying layer 411 is patterned in such a way that negative ramp angles arise. As a result, the remaining lines 430 decrease in size by in each case the ramp angle range, that is to say that the lines become smaller by the value $W=2*h/\tan \beta$, where β is the angle between the substrate surface and the inwardly inclined edge (see FIG. 14 and FIG. 15).

Using the patterned lines 430 in the layer 411, the underlying layer 300 is patterned anew, wherein the width of the lines at the lower edge at the transition to the layer 300 is transferred to the underlying layer 300. Subnominal line structures that are smaller than the photolithographic line width arise.

Subsequently, the layers 412 and 411 are completely removed and a renewed patterning operation is carried out using the patterned layer 300.

The layer 300 now contains subnominal gap widths and subnominal line widths in comparison with a critical dimension at the predetermined locations. Of course, the layer 300 can contain larger structures and also structures which correspond to the critical dimension.

Using the patterned layer 300, the underlying layer 200 is patterned, with which the gates of the transistors are produced.

Figure 17:
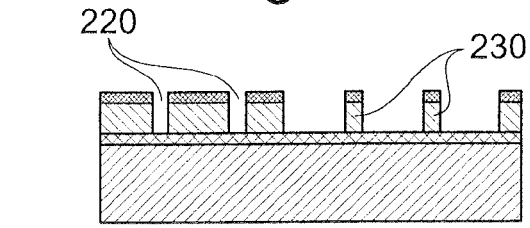

It is subsequently possible to remove the layer 300 to leave a patterned polysilicon layer 200 having subnominal gaps 220 and subnominal lines 230 (cf. FIG. 17).

A conventional CMOS process can subsequently be carried out.

In order to use the minimum structures, an implantation for producing source/drain regions in the regions of subnominal gap widths should subsequently be avoided.

In the variant of the etching method in accordance with FIGS. 18 to 29, the same layers are employed as in the method in accordance with FIGS. 6 to 17, for which reason the same reference symbols are used for the layers and the structures. What are different from the production method according to FIGS. 6 to 17 in the production method according to FIGS. 18 to 29 are the process sequence and the layer sequence. The production method illustrated by FIG. 18 to FIG. 21 corresponds to that in FIGS. 6 to 9. In contrast to the method in accordance with FIGS. 6 to 17, however, the underlying mask layer 300 is not patterned by means of the patterned layer 401 after the production of the openings 420, rather the photoresist layer 402 is completely removed (see FIG. 22) and a renewed photoresist layer (412) is applied. As in the method in accordance with FIGS. 1 to 12, the layer 412 is patterned in accordance with the structures in which the intention is to achieve a line width smaller than a line width which is still possible photolithographically according to the critical dimension. Lines 430 can be seen in FIG. 24. These lines 430 are greater than or equal to the minimum line width using the photolithographic possibilities.

Using the patterned layer 412 with lines 430, the underlying layer 400 is patterned in such a way that negative ramp angles arise. As a result, the remaining lines 430 decrease in size by in each case the ramp angle range (see FIG. 25). The photoresist layer 412 is subsequently removed (see FIG. 26), a patterned layer 401 remaining which is used to pattern the underlying layer 300 (mask layer). In accordance with the width of the openings and lines, respectively, at the base of the layer, these dimensions are transferred to the layer 300 in the patterning process, to be precise in a single patterning step, whereas two patterning steps are employed for the layer 300 in the method in accordance with FIGS. 6 to 17.

The patterned layer 300 can be seen in FIG. 22. The further process sequence in accordance with FIGS. 23 and 24 then corresponds once again to the process sequence in accordance with FIGS. 16 and 17.

LIST OF REFERENCE SYMBOLS

1 System-on-chip
2 Digital domain
3 Pixel matrix
4 Voltage converter
5 LED driver
6 EEPROM
7 PLL/DLL module
8 A/D converter
9 Contact area
10 Sensor circuit
11 Chip
12 Printed circuit board
13 Pad
14 Solder ball
15 Light
16 Filter layer with microlenses
17 Bulk material
18 Electronic circuits
19 Charge carriers
20 2-poly EEPROM
21 p-type substrate
22 Gate oxide
23 Field oxide
24 Tunnel oxide
25 1-poly EEPROM
100 Wafer
101 Doped regions
102 Structures
103 Dielectric
200 polysilicon
220 Subnominal gaps
230 Subnominal line
300 Mask layer
320 Structures
400 Layer stack
401 BARC layer
402 Photoresist
403 Opening
411 BARC layer
412 Photoresist
420 Opening
430 Line
CG Control gate
D Drain terminal
FG Floating gate
N+ (n+) layer
S Source terminal

The invention claimed is:

1. A sensor apparatus comprising at least one analog and one digital circuit component and an analog/digital converter for converting analog signals of the analog circuit component into digital signals for the digital circuit component, and vice versa, wherein the analog circuit component and the digital circuit component in each case comprise at least one module for electronically implementing a function, and wherein one of the modules of the analog circuit component is embodied as a sensor device for detecting electromagnetic radiation and one of the modules of the digital circuit component is embodied as a signal processing device for processing digital signals, wherein the circuit components including the analog/digital converter are integrated as an integrated circuit in a chip and the chip is manufactured as a semiconductor structure using 1-poly technology.

2. The sensor apparatus according to claim 1, wherein at least one of the modules of the digital circuit component is embodied as a non-volatile memory for storing configuration parameters.

3. The sensor apparatus according to claim 1, wherein the digital circuit component is manufactured using CMOS technology.

4. The sensor apparatus according to claim 2, wherein the non-volatile memory is an FGFET.

5. The sensor apparatus according to claim 4, wherein the FGFET comprises a control gate structure with a buried layer.

6. The sensor apparatus according to claim 1, wherein at least one of subnominal gaps are formed in the analog circuit component and subnominal lines are formed in the digital circuit component.

7. The sensor apparatus according to claim 1, wherein the digital circuit component comprises at least one of an apparatus for controlling a phase shift, and a timer resonant circuit.

8. The sensor apparatus according to claim 1, wherein the analog circuit component comprises at least one of a sensor for detecting radiation together with a structure for transporting induced free charge carriers, an amplifier, a voltage regulator, a voltage converter, and a temperature sensor for detecting and correcting temperature-dictated drift.

9. The sensor apparatus according to claim 1, wherein the analog circuit components are designed for higher voltages than the digital circuit components.

10. The sensor apparatus according to claim 1, wherein the analog and digital circuit components comprise semiconductor components having oxide layers for electrical insulation, wherein at least one of the oxide layers of the analog circuit components is embodied as thicker than that of the digital circuit components.

11. The sensor apparatus according to claim 2, wherein a gate oxide layer of the analog circuit component has a thickness of 9 nanometers to 15 nanometers, a gate oxide layer of the non-volatile memory has a thickness of 6 nanometers to 10 nanometers, and a gate oxide layer of the remaining digital circuit component has a thickness of 1.5 nanometers to 3 nanometers.

12. A method for producing a sensor apparatus according to claim 1.

13. The method according to claim 12, wherein at least one part of the method comprises a 200 nm CMOS manufacturing method.

14. The method according to claim 12, wherein at least one of subnominal gaps and subnominal lines are produced by means of a bi-subnominal etching method.

15. A detection apparatus comprising a sensor apparatus according to claim 1 for detecting an object.

16. A time-of-flight sensor comprising the sensor of claim 1.

17. A CCD sensor comprising the sensor of claim 1.

18. The sensor of claim 2, wherein the non-volatile memory is an EEPROM.

19. The sensor of claim 7, wherein the apparatus for controlling a phase shift is a DLL.

20. The sensor of claim 7, wherein the timer resonant circuit is a PLL.

* * * * *